Dec. 15, 1925.
A. L. BYSTROM
1,565,254
PIPE COVERING
Filed April 1, 1924
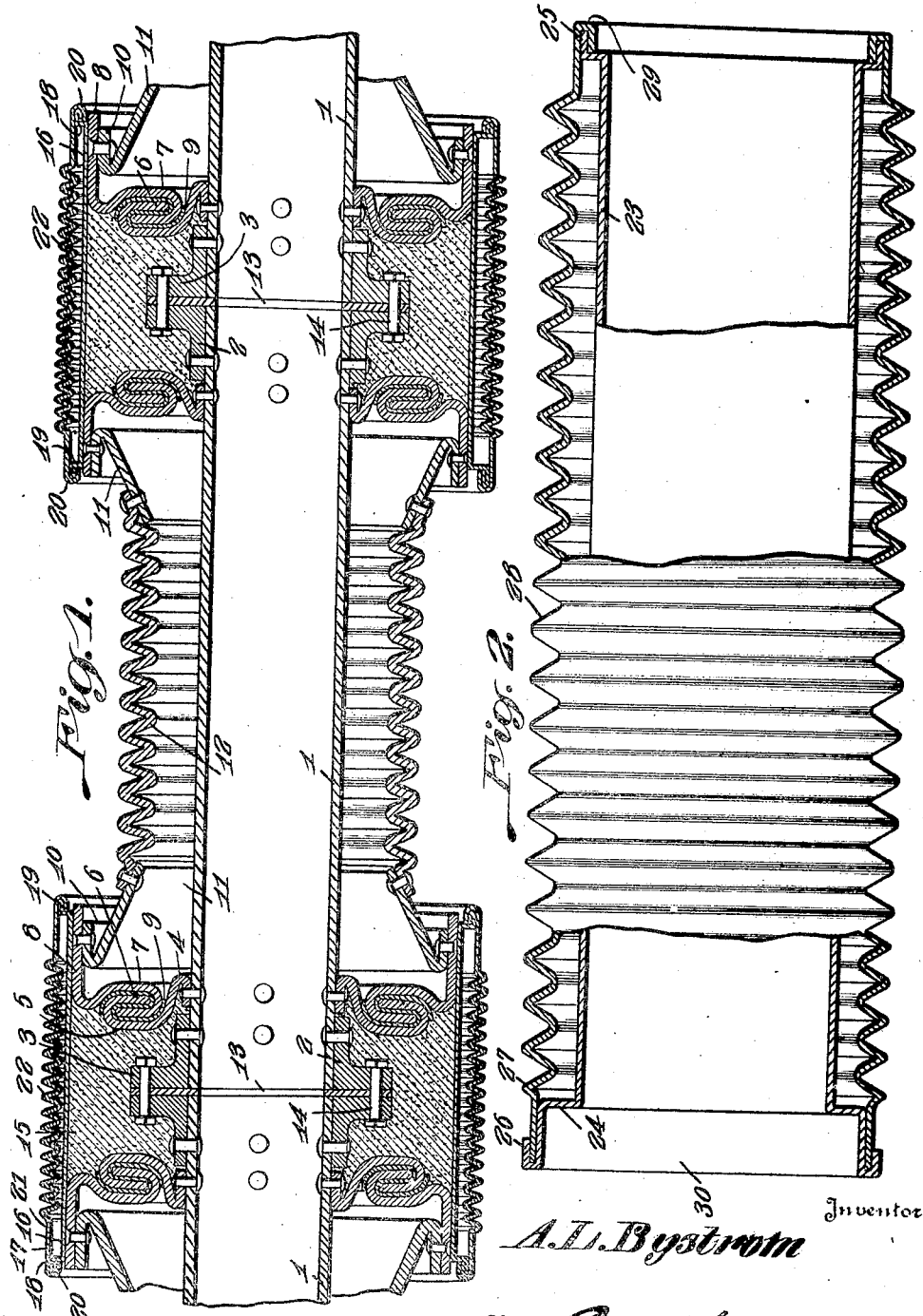
Inventor
A.L.Bystrom
By C.A.Snow & Co.
Attorney Patented Dec. 15, 1925.

1,565,254

UNITED STATES PATENT OFFICE.

ALBERT LEONARD BYSTROM, OF TOWER, MINNESOTA.

PIPE COVERING.

Application filed April 1, 1924. Serial No. 703,479.

*To all whom it may concern:*

Be it known that I, ALBERT L. BYSTROM, a citizen of the United States, residing at Tower, in the county of St. Louis and State of Minnesota, have invented a new and useful Pipe Covering, of which the following is a specification.

This invention relates to a pipe covering for use in connection with steam pipes and the like, one of the objects being to provide a covering formed of units that can be assembled readily and operate to maintain a partial vacuum around the steam pipe, and to properly insulate the joints of the covering so as to maintain the partial vacuum unimpaired.

A further object is to provide a covering the outer casing of which is capable of expansion and contraction under variations of temperature.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred forms of the invention have been shown.

In said drawings

Figure 1 is a longitudinal section through one form of pipe covering embodying the present improvements.

Fig. 2 is a section through another form.

Referring in the figures by characters of reference 1 designates the inner tubular member of the covering each end of which is surrounded by a collar 2 fastened to the member by rivets or the like and provided with an outstanding annular flange 3. Secured to the tubular member close to each of the collars 2 is a ring 4 having an outstanding annular portion 5 the outer edge of which is inturned to provide a gripping flange 6 extending around the member 1 and concentric with and spaced from the inner portion of the ring 4.

Flange 6 is adapted to interfit or interlock with a flange 7 extending inwardly from a ring 8 concentric with the member 1, this flange having its free edge portion bent or turned back so as to interlock with flange 5 as shown. A sealing strip 9 of cork or other suitable material is gripped between the interlocking annular portions 5 and 7 so as to prevent leakage of air between them.

Extending into and secured to the ring 8 is a flange 10 provided at the base of a frusto-conical ring 11 extending around member 1 but spaced from it.

The structure hereinbefore described is provided at each end of each tubular member 1 and the frusto-conical members 11 at the two ends project into and are secured to the ends of a corrugated outer tubular member 12 substantially concentric with member 1. Thus an annular space is provided between the members 1 and 12 and between the interlocking members at the two ends of the structure, this space providing a partial vacuum for the purpose of retarding the conduction of heat between the members 1 and 12.

The complete structure thus far described constitutes one complete unit of the pipe covering. When two or more units are to be assembled they are placed end to end with a sealing gasket 13 between them and between the flanges 3. The units are then fastened together by means of bolts 14 or the like extending through the flanges 3. The space surrounding the collars 2 and their flanges 3 and located between the interlocking portions 5 and 7 is filled with asbestos or other suitable insulating packing indicated generally at 15. A sleeve 16 is then placed in position around the adjoining rings 8 of the two units. This sleeve has its end portions provided with annular flanges 17 extending outwardly therefrom and provided with offset portions 18 and 19 respectively. These offset portions are adapted to project into the inturned ends 20 of an outer sleeve 21 corrugated as shown at 22 and spaced from the sleeve 16 so as to provide a partial vacuum between the sleeves.

It is to be understood that the pipes to be covered extend through the tubular members 1 and air is to be exhausted from these tubular members so as to leave a partial vacuum. After the covering has been assembled with the pipes the loss of heat by radiation will be practically eliminated and a great saving of fuel and heat can thus be effected.

Instead of constructing the covering as illustrated in Fig. 1 the simplified form shown in Fig. 2 may be employed. This includes an inner tubular member 23 having laterally offset annular flanges 24 and 25 at its respective ends, the free end portion of the flange 24 being bent back as shown at 26 so as to lap and interlock with one end of an outer tubular member 27. This outer member has annular corrugations 28 and the other end of the outer member is inturned as at 29 so as to interlock with the offset flange 25. The external diameter of this end of the covering shown in Fig. 2 is substantially equal to the internal diameter of the countersink 30 formed by the offset flange 24. Thus it will be seen that when two or more of these covering units are assembled end to end the countersink 30 of each unit can receive the adjoining end of the next unit. Air is to be withdrawn from the space between the members 23 and 27 and the partial vacuum thus established will practically prevent conduction of heat rays from one member to the other. In this structure as well as in the form shown in Fig. 1 the corrugated members permit free expansion and contraction without injurious distortion when subjected to climatic changes. It will be obvious that a partial vacuum can be established at the desired points in the covering in any known way such as by the use of valved outlets to which air exhausting pumps can be applied. This method of creating a partial vacuum is so well known that a detailed description or illustration thereof is not deemed necessary.

What is claimed is:—

A pipe covering including similar units each comprising an inner tubular pipe receiving member, annular outstanding portions at the ends of the member, an outer tubular member provided with annular corrugations, there being a partial vacuum between said members, and means at the ends of the outer tubular member interlocking with the annular outstanding portions to seal the space between the members, and means for sealing the connection between the units, said last mentioned means including connected inner and outer sleeves fitted upon said ends and having a partial vacuum between them, and an insulating packing surrounded by the inner sleeve.

In testimony that I claim the foregoing as my own, I have hereto affixed my signature.

ALBERT LEONARD BYSTROM.